United States Patent Office 3,651,048
Patented Mar. 21, 1972

3,651,048
PURIFICATION PROCESS

Charles George Lex, Kenosha, Wis., assignor to Abbott Laboratories, Chicago, Ill.
No Drawing. Continuation-in-part of application Ser. No. 809,963, Mar. 24, 1969. This application Feb. 25, 1970, Ser. No. 14,232
Int. Cl. C07c *173/10*
U.S. Cl. 260—239.5         7 Claims

ABSTRACT OF THE DISCLOSURE

Crystalline, pure piperazine estrone sulfate is obtained by refluxing the crude material in a low-boiling alcohol containing a small amount of a weak base and a small amount of water, filtering the solution while still hot, concentrating the filtrate and cooling it slowly.

---

This application is a continuation-in-part of copending application Ser. No. 809,963, Mar. 24, 1969, now U.S. Pat. No. 3,525,738.

DETAILED DESCRIPTION OF THE INVENTION

Piperazine esterone sulfate, a widely used hormone preparation, has been known for many years but has always been produced by methods which result in an end product of insufficient purity for direct pharmaceutical use. Only complicated and involved methods have been described in the past for the purification of piperazine estrone sulfate resulting in large losses of the valuable material or producing a product of barely acceptable quality or purity.

It is therefore an object of the present invention to produce pure, crystalline piperazine estrone sulfate from the crude material; it is another object of this invention to provide a simple process for the purification of piperazine estrone sulfate; it is a further object of this invention to provide an efficient and effective purification process for the production of pure crystals of piperazine estrone sulfate.

These and other objects are accomplished by placing 1 part by weight of crude piperazine estrone sulfate in at least 6 volume parts of an alcohol with 1–4 carbon atoms containing 0.5–5% of water and between 0.05 and 0.2 parts by weight of a base having a $K_b$ of $\leq 6.4 \times 10^{-5}$, refluxing the mixture for at least 15 minutes, filtering the mixture at a temperature of at least 50° C., concentrating the filtrate to a solids content of between 5 and 20% (weight per volume), and cooling the resulting solution slowly to a temperature of 0 to 25° C. The pure piperazine estrone sulfate crystallizes out of the solution and can be collected by filtration, centrifugation or other practical, well-known methods. If desired, the crystals may be washed on the filtrate with a pure alcohol of 1–4 carbon atoms, a low-boiling ether or, preferably, with a mixture of methanol and ethyl ether in a volume ratio of 1:9 to remove traces of the solvent system used in the purification step.

The piperazine estrone sulfate material obtained in this fashion is 98–100% pure; it may contain traces of estrone which are tolerated in a product of this nature. The color of the crystals is pure white; however, when the crude piperazine estrone sulfate that is to be purified produces a strongly discolored solution in the above solvent system, it is often indicated to add small amounts of activated charcoal before filtration.

Among the weak bases that can be used by the above defined $K_b$-value are pyridine, ammonia, piperazine and the like. Piperazine is the preferred material since it does not introduce a new chemical entity into the system. Stronger bases cannot be used because the piperazine moiety of the piperazine estrone sulfate molecule would be replaced by the cation of the strong base. However, a basic system must be used since the piperazine estrone sulfate complex breaks easily and is very sensitive to acids.

The amount of the base used is not very critical within the above limits; it is based on the amount of piperazine estrone sulfate to be purified. If less than 5% by weight of the base are used, the purification is less efficient and the resulting product is less pure; if more than 20% of the base are used, several disadvantages accompany the method: the cost of the solvent mixture increases, the evaporation step is unnecessarily prolonged, and a more thorough washing of the resulting crystals becomes mandatory.

The amount of the solvent described above being used is of no consequence since any excess is evaporated prior to crystallization of the pure piperazine estrone sulfate. A minimum of 6 volume parts per part by weight of crude piperazine estrone sulfate has been found to be essential to dissolve most of the crude material; when more than 20 parts of solvent are used, the evaporating period becomes excessible so that for practical consideration, 6–20 volume parts of solvent are recommended.

The major constituent of the purification medium is an alcohol of the formula ROH wherein R is an alkyl group of 1–4 carbon atoms. Excellent results are obtained with methanol, ethanol, isopropanol, butanol, etc. Almost equal results are obtained with any of these solvents; however, the use of methanol or ethanol are preferred for reasons of economy in their evaporation. Another constituent of the solvent mixture used in the present process is water. An amount of as little as 0.5% by volume is sufficient to produce the desired result. When less than that amount of water is used, crystallization is very slow and rock-like material is obtained. When amounts of above 5% by volume of water are used, the purification is less efficient, resulting in considerable material losses. A preferred purification medium contains 1–3% by volume of water.

In a general embodiment of the present process, 1 part by weight of crude piperazine estrone sulfate is placed in 6–20 volume parts of an alkanol of formula ROH wherein R is an alkyl group of 1–4 carbon atoms containing 0.5–5.0% by volume of water, adding 0.05–0.2 parts by weight of piperazine, heating the mixture to reflux temperature for at least 15 minutes, filtering the solution at a temperature above 50° C., concentrating the filtrate to a total volume of about 5 parts, and allowing the concentrate to slowly cool to room temperature or below. The formed crystals of pure piperazine estrone sulfate may be collected by filtration; they may be washed in the usual manner, for instance with 5 volume parts of ethyl ether containing 10% methanol.

In order to illustrate the process of the present invention in more detail, reference is made to the following examples which are, however, not to be construed as limiting the invention in any respect. In all instances, the purity of the starting material and the purified piperazine estrone sulfate were established by the method known from the National Formulary, vol. 11, p. 284.

EXAMPLE 1

Dimethylformamide was dried by atmospheric distillation at 152–153° C. to analyze less than 0.1% water. To one liter of dry dimethylformamide under nitrogen purge in a round-bottom flask fitted with a mechanical stirrer, thermometer and addition funnel was added 50 ml. (93 g.) liquid sulfur trioxide under stirring and suitable cooling means. Fuming was minimal due to the virtual absence of water. After the addition was complete, the reaction mixture was stirred until the temperature reached +10° C.

To a solution containing 0.0828 mole of the sulfur trioxide complex in 50 ml. of dimethylformamide, 0.06 mole of estrone was added at once and the mixture was stirred for 2 minutes to form a colorless, clear solution. After 1 hour of stirring at room temperature, 0.1 mole of piperazine was added and stirring continued for 30 minutes at 30° C., while another 25 ml. of dimethylformamide was added. The mixture was then filtered and the filter cake was washed with about 7.5 ml. of dimethylformamide. To the combined filtrate and wash liquor, ether was added dropwise under stirring until three times the initial volume was reached. The formed precipitate was collected, washing with ether/methanol 5:1 and dried for 2 hours at 60° C. in a vacuum oven. The product had a purity of 92% and was obtained in quantitative yield.

One part of the above crude piperazine estrone sulfate was refluxed for 1 hour in 7.5 parts by volume of methanol containing 2% by volume of water and 0.1 part by weight of piperazine. The solution was filtered hot and the filtrate was concentrated to a volume of 5 parts. After allowing the filtrate to cool to 10° C., the formed crystals were collected by filtration. The filter cake was washed with 6 parts by volume of methanol/ethyl ether 1:9 and dried in a vacuum oven at 60° C. The material obtained in this fashion showed a purity of 99% and was obtained in a yield of 90%.

The filtrate obtained after removing the pure piperazine estrone sulfate was used as the solvent for a second batch of crude material. The purity of the piperazine estrone sulfate obtained in this reuse of the solvent was identical to the above but the yield in this operation increased to 92% of theory.

EXAMPLE 2

A crude piperazine estrone sulfate batch of 90% purity was treated as in Example 1 but with 14 volume parts of a solvent system containing 2.5% of water and 0.1 part by weight of piperazine in methanol. The filtrate obtained after hot filtration of the refluxed mixture was not concentrated and allowed to cool slowly to 10° C. The resulting piperazine estrone sulfate crystals showed a purity of 100% but a yield of only 43% of theory was obtained. Additional material of very slightly lower purity was obtained as a second crop from the filtrate after concentrating the filtrate to one-half of its initial volume.

EXAMPLE 3

The process of Example 1 was followed using 6 parts by volume of methanol containing 1% water and 0.1 parts by weight of piperazine per part of piperazine estrone sulfate. The purified material showed a purity of 99.5% and was obtained in a yield of 90%. The starting material used in this case had a purity of 95.5%.

EXAMPLE 4

In a repetition of Example 2 using the same amount and purity starting material but 13.3 parts by volume of an n-butanol mixture containing 2.5% of water and 0.1 part by weight of piperazine, the final material was obtained in a yield of 91% and a purity of 98.7% after evaporation of the solvent to 12 parts by volume.

EXAMPLE 5

In this repetition of the procedure of Example 1, the refluxing medium consisted of 9 volume parts of methanol containing 0.1 parts by weight of piperazine and no water. The filtrate was concentrated to two thirds of its volume and the solution was allowed to cool to 10° C. The pure piperazine estrone sulfate crystallized extremely slowly and was obtained in a rock-like, clumpy form with a purity of only 96.6%; yield was 89.2% of theory.

EXAMPLE 6

The procedure of Example 1 was repeated, using 10 g. of a 95.5% pure piperazine estrone sulfate and 250 ml. of ethanol containing 0.5% of water and 1 g. of piperazine. The mixture was heated to reflux for 30 minutes, filtered, concentrated to a volume of 200 ml. and allowed to crystallize. A yield of 8.9 g. of the purified product was obtained as a first-crop crystallisate with a purity of 99.5%.

EXAMPLE 7

In a repetition of the procedure shown in the above examples, 10 g. of a crude piperazine estrone sulfate of 92% purity, 60 ml. methanol containing 1 ml. of water and 1 ml. of pyridine was used. After refluxing for 20 minutes and hot filtration, the volume of the filtrate was reduced to 45 ml. and allowed to cool slowly to 10° C. The fine, fluffy, white crystals obtained were collected on a filter, washed with 20 ml. of ether/methanol 9:1 and finally dried for 20 hours at 60° C. in a vacuum oven. The crystals analyzed over 99% purity and were obtained in a yield of 89% with a melting point of 192–4.5° C.

EXAMPLE 8

A mixture of 10 g. of crude piperazine estrone sulfate of 92% purity in 60 ml. of methanol containing 2.0 ml. of 28% aqueous ammonia was refluxed for 20 minutes, filtered hot and the filtrate was concentrated to a total volume of 50 ml. The filtrate was allowed to cool slowly to 50° C., producing fluffy, rather large, white crystals which were washed with 10 ml. of ether/methanol 4:1 and dried 4 hours at 60° C. under vacuum, producing 9.08 g. of piperazine estrone sulfate of 98.7% purity.

As shown above, a number of organic or inorganic bases can be used in the present process as explained above. It is also shown that various alcohols can be used as the base for the new purification medium. With the lower boiling alcohols, refluxing the mixture for a few minutes is recommended; with the higher boiling alcohols such as propanol or any of the butanols, refluxing is acceptable but usually, heating to a temperature of 50 to 100° C. for a period of 15 minutes is sufficient. Of course, longer refluxing or heating periods can be used without detrimental effect but no additional benefits are obtained by extending this heating time beyond 1 hour. Of course, a more complete crystallisate is obtained by evaporating the solution to a solids content of 20% and cooling it to 10° C., but a 5–10% solution or cooling to room temperature also produces satisfactory results. The maximum concentration of the filtrate is, of course, somewhat dependent on the alcohol used; for instance, with methanol, a higher concentration can be achieved than with ethanol.

It will be seen from the above examples that by observing the limits set forth for the new process, crystalline material of extremely high purity is obtained in a simple and fast operation that results in minimal loss of material. Of course, it is to be understood that routine deviation from the steps given in detail above are within the spirit of the new procedure. For instance, the heating of the concentrated product solution with activated carbon and the additional filtration necessary does not in any way alter the present process; it will at times improve the color of the filtrate and the crystals of piperazine estrone sulfate. Also, at times, the use of a filter-aid is indicated in the filtration step which precedes concentration of the hot crystallization solution.

I claim:
1. The process of purifying piperazine estrone sulfate consisting essentially in heating 1 part by weight of crude piperazine estrone sulfate in at least 6 volume parts of a solvent mixture consisting of an alcohol with 1–4 carbon atoms containing 0.5–5% by volume of water and 0.1–0.2 parts by weight of a base with a $K_b \leq 6.4 \times 10^{-5}$ to a temperature above 50° C., filtering the solution at a temperature above 50° C., concentrating the filtrate to a solid content of 5–20%, slowly cooling said concentrated solution and collecting the pure crystals of piperazine estrone sulfate.

2. The process of claim 1 wherein said alcohol is methanol.

3. The process of claim 2 wherein said filtrate is concentrated to a solids content of 10–20% by weight.

4. The process of claim 1 wherein said base is piperazine.

5. The process of claim 4 wherein said filtrate is concentrated to a solution with a solids content of 10–20% by weight.

6. The process of claim 1 wherein said heating is carried out for 15–60 minutes at a temperature of 50–100° C.

7. The process of claim 1 wherein said volume of the solvent mixture is 6–20 parts by volume per part by weight of piperazine estrone sulfate.

References Cited

FOREIGN PATENTS 498,386  12/1953  Canada _____ 260—239.5

LEWIS GOTTS, Primary Examiner

E. G. LOVE, Assistant Examiner